United States Patent [19]

Bradshaw

[11] 4,044,722

[45] Aug. 30, 1977

[54] TIMED PET FOOD DISPENSER

[76] Inventor: John O. Bradshaw, Rte. 1, Box 117-F, New Canton, Va. 23123

[21] Appl. No.: 714,087

[22] Filed: Aug. 13, 1976

[51] Int. Cl.² .............................................. A01K 5/02
[52] U.S. Cl. .................................................... 119/51.13
[58] Field of Search ............... 119/51.13, 51.11, 51.5; 222/144; 221/113, 119, 121, 122

[56] References Cited

U.S. PATENT DOCUMENTS

| | | | |
|---|---|---|---|
| 2,528,742 | 11/1950 | Coffing | 119/51.5 X |
| 2,967,644 | 1/1961 | Barber et al. | 222/144 |
| 3,754,527 | 8/1973 | Jenkins | 119/51.11 |

*Primary Examiner*—Hugh R. Chamblee
*Attorney, Agent, or Firm*—Auzville Jackson, Jr.

[57] ABSTRACT

The disclosure is directed to a timed pet food dispenser wherein a plurality of insulated and covered food containers are rigidly and removably mounted to a rotating dispensing wheel for periodic automatic dispensing of the pet food at predetermined times by gravity to a pet food pen.

2 Claims, 8 Drawing Figures

TIMED PET FOOD DISPENSER

This is a substitute for abandoned application Ser. No. 508,150, filed Sept. 20, 1974.

BACKGROUND OF THE INVENTION

This invention is made for the purpose of automatically dispensing food to animals at periodic intervals without the necessity of continual attention on the part of the owner or at times when the owner desires to be away from the home for several days at a time.

The patent literature shows many timed feeders have been designed in the past, the latest being U.S. Pat. No. 3,955,537, issued May 11, 1976, to Toshio Yugiri. However, none of these patents show the use of a plurality of food containers which are rigidly and removably mounted on a dispensing wheel which rotates and is indexed about a horizontal axis with each container having a hinged cover which is tripped by means of a timing and actuating mechanism so that the contents of the individual containers fall at predetermined times into a pet eating area. Other novel features will appear as the dispenser is further described.

The timed pet food dispenser enables the owner to feed hot, cold, damp, or dry food and to keep it from spoilage by means of insulated containers, which can be easily removed from the dispensing wheel, separately or as many as necessary, for cleaning and/or refilling.

Another feature of this invention is that it is portable, simply constructed and highly efficient in operation.

Still another feature of the invention is that it is attractively covered so that it may be permanently and visibly located in the living quarters of the owner without visually intruding offensively into the room. In this connection the dispenser cover has a top access opening for removing, cleaning, filling and replacing the food containers.

A still further feature of the invention is a relatively simple operating mechanism that permits the dispensing wheel to be rotated mechanically in one direction but is free to rotate in the opposite direction for rapid cleaning or removal of the individual food containers.

The foregoing and other features and advantages of the invention will be understood from the following description of a preferred specific embodiment, which description should be read with reference to the accompanying drawings in which.

DESCRIPTION OF THE INVENTION

Figure 1:
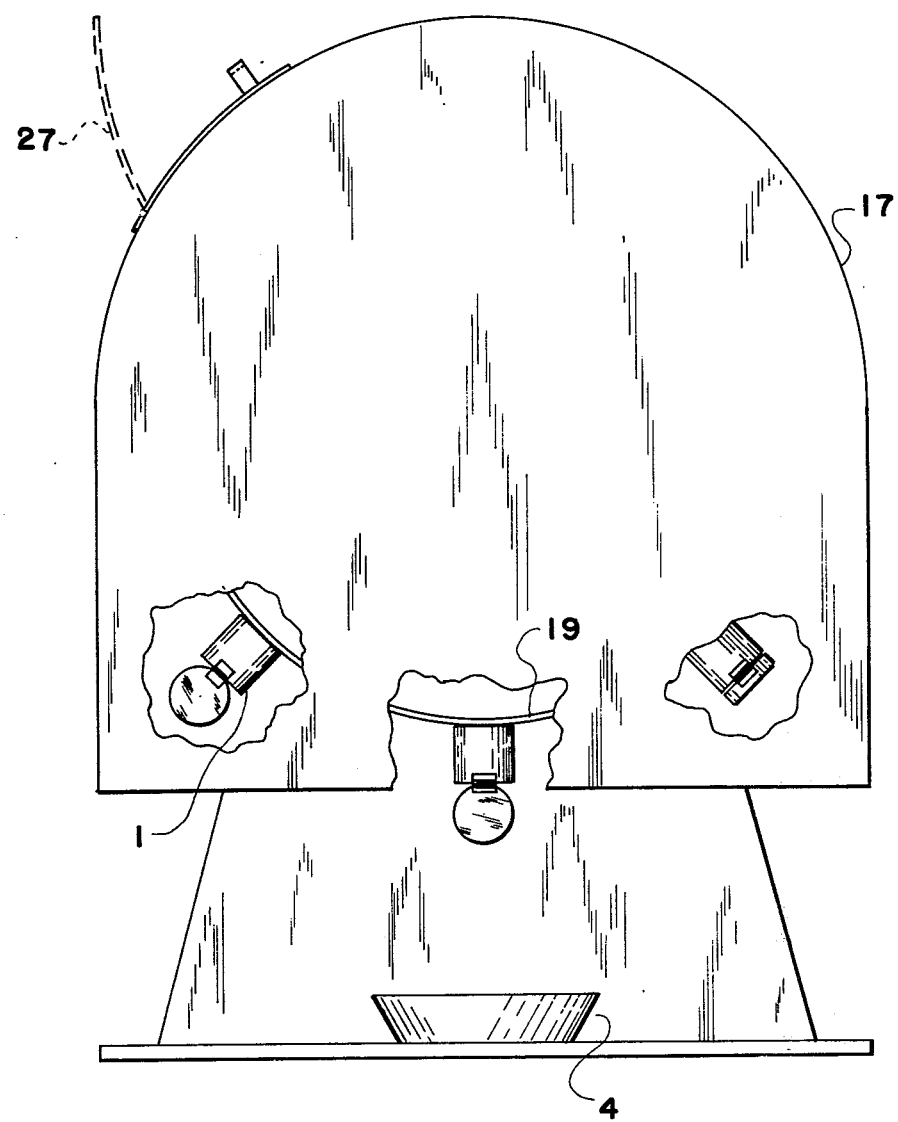
FIG. 1 is an overall frontal view of the dispenser with portions broken away to more clearly show the inventive features.

With reference to FIG. 1, there is shown a front overall view of a timed pet food dispenser plus certain portions broken away to better illustrate the invention, a plurality of insulated food containers 1 mounted at their bottom about the periphery of a dispensing wheel 19. The dispensing wheel is mounted for rotation about a horizontal axis of the dispenser stand 3 in a manner that when the covers or lids of the individual food containers open, the food can drop by gravity into a pet feeding area, usually a food pan 4. A dispenser cover 17 is utilized to cover and provide protection to the moving parts of the dispensing wheel and make it sufficiently attractive to occupy a regular location in the living quarters of a household without visually intruding in an offensive manner. So that the individual containers can still be removed for cleaning and refilling, a top access opening with cover 27 is provided.

Figure 2:
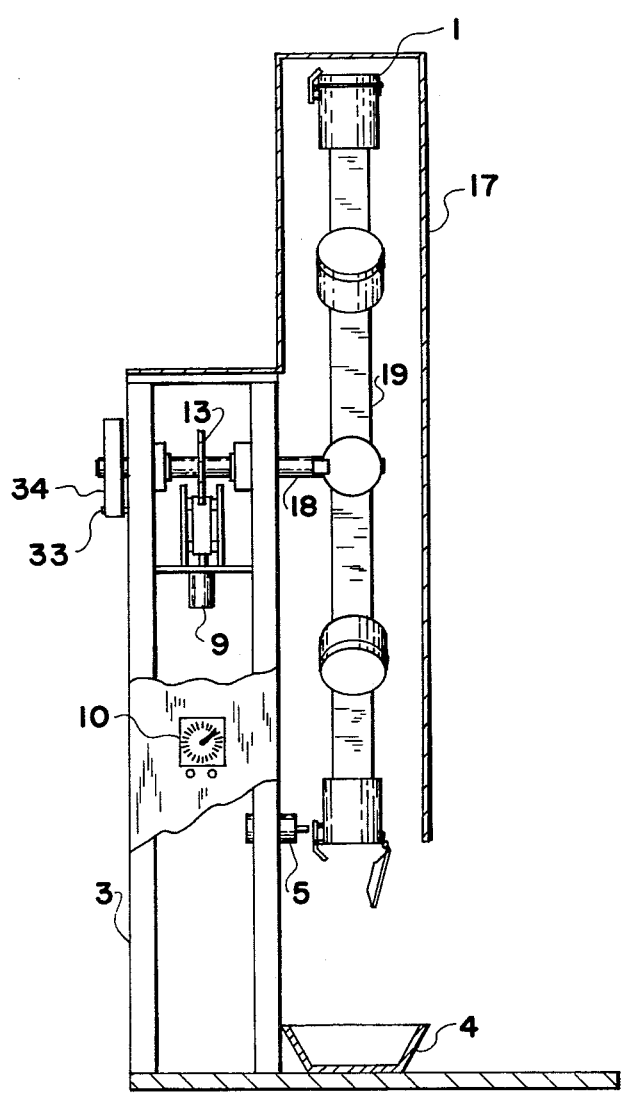
FIG. 2 is a side sectional view.
Figure 3:
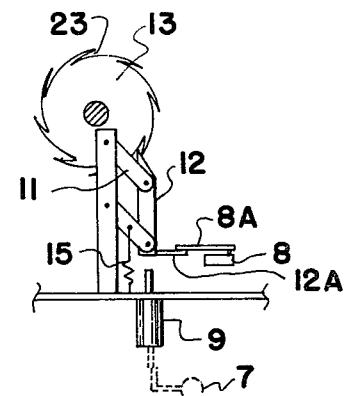
FIG. 3 shows a portion of the actuating mechanism.
Figure 5:
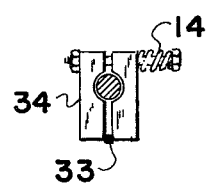
FIG. 5 shows the braking mechanism.

With reference to FIG. 2, a sectional side view illustrating the mechanism of the invention, ten insulated food containers 1 are provided and mounted about the periphery of the dispensing wheel 19 which is covered by dispenser cover 17. The dispensing wheel 19 rotates about a shaft 18 which attaches a dispensing wheel 19 to the stand 3. The shaft has at an end opposite from the dispensing wheel, a brake mechanism mounted to the stand by pivot pin 33. The brake mechanism has a brake 34 which surrounds the shaft 18 as best seen in FIG. 5 and applies friction thereto by means of a large spring 14 and nut and screw arrangement. The more the nut and screw arrangement is tightened the greater the friction is on the shaft. The friction is adjusted so that the dispensing wheel can be rotated in one direction for rapidly unloading or loading the insulated food containers onto the wheel, but prevents overtravel in the other direction the wheel is rotated by the indexing actuating mechanism. A solenoid 9 causes an indexing sequentially of the dispensing wheel by operating ratchet 13 in a manner more clearly shown in FIG. 3. In FIG. 3 there is shown the ratchet 13 attached to the shaft 18 with a microswitch beam actuator 8A related to trip member 12A. A solenoid 9, cushioned by a dashpot 7, is actuated and pushes on the bottom end of ratchet pawl arm 12 which is linked by two parallel levers 11 to a stationary vertical member. A pawl arm return spring 15 causes the ratchet pawl arm to return to its retracted position when the solenoid is deactuated.

FIG. 3 shows the mechanism just after the solenoid has been deactuated but before the spring has returned the ratchet pawl arm to its retracted position. The operation of the mechanism shown in FIG. 3 and its relationship with the remainder of the actuating mechanism will be more fully described when the entire operating sequence is described below.

Also shown in FIG. 2 is a low voltage solenoid 5 for tripping the trip lever 2. Still further, there is shown the 24-hour timer clock 10.

Figure 4:
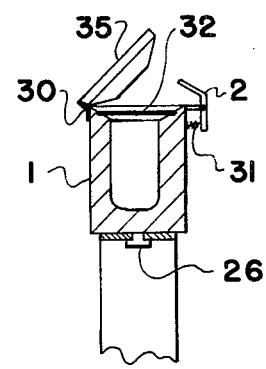
FIG. 4 shows a sectional view of an individual container mounted on the dispensing wheel with the cover partially open to more clearly show the various parts.
Figure 6:
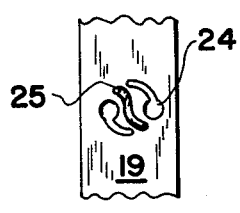
FIG. 6 shows the manner by which the container is locked to the dispensing wheel.

With reference to FIGS. 4 and 6 there is shown an insulated food container 1 having insulated walls and a container lid 35 hinged at pivot 30. The container lid 35 is insulated as is the container and has a tapered base to match with a complimentary taper at the opening of the container so that when they meet with one another they fit tightly together which fit is enhanced by the use of a seal 32 located in the container's mating surface. Beside the container is a trip lever 2 which is normally closed to hold the container lid 35 in the closed position by means of trip lever spring 31 which exerts a compressive force on trip lever 2.

Each container has at its bottom two lugs 26 which have enlarged heads and smaller body diameter which mate with two lug receiving holes 24 on the periphery of the dispensing wheel 19. The holes have at one end enlargements sufficient to receive the head of the lug 26 and taper down so that the slotted portion of the hole is of only a sufficient width to take the smaller diameter portion of the lugs. Thus, the two enlarged heads are inserted into the holes at their enlarged portions and twisted so that the smaller diameter of the lug enters into the narrow arcuate portions of the holes 24. A simple lug holding spring 25 located on the periphery of the dispensing wheel 19 between the two holes 24 applies an outward pressure against the bottom of the food container to insure it maintaining its locked position in the holes. Thus the insulated food container is removably and rigidly mounted upon the dispensing wheel. Its removal is accomplished by a simple twist in the opposite direction until the enlarged heads of the lugs line up with the enlarged portions of the dispensing wheel.

Figure 7:
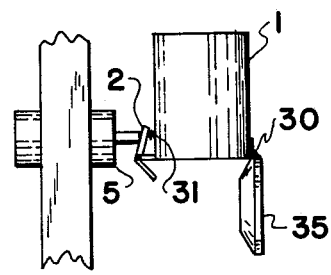
FIG. 7 shows a portion of the actuating mechanism and how it functions to trip an individual food container to permit its cover or lid to open.

With reference to FIG. 7 there is shown in greater detail the operation of the low voltage solenoid for tripping the opening of the food dispenser. Here the solenoid 5 has just been actuated and has forced the insulated container trip lever 2 against the compression spring or trip lever spring 31 compressing it against the side of the insulated food container 1 which permits container lid 35 to open by gravity about its pivot 30 connected to the side of the container and thus permit any of its contents to fall in a vertical direction into the pet feeding area.

Figure 8:
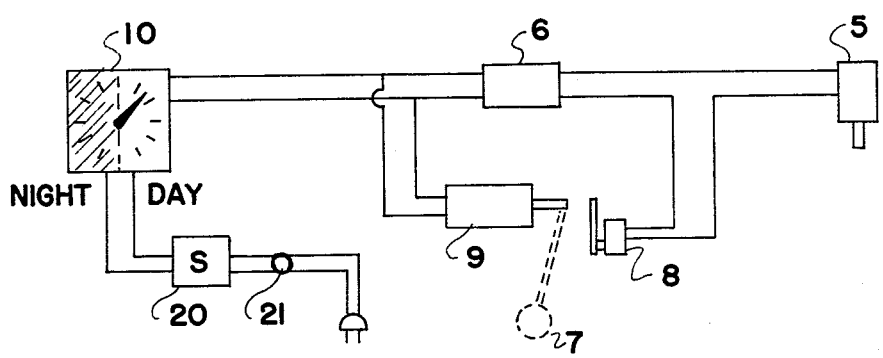
FIG. 8 shows a schematic of the timed actuating mechanism.

With reference to FIG. 8 there is shown a schematic of the operating mechanism. First there is a 24-hour clock 10 which is connected to a switch 20 that can deenergize the whole system and through a fuse 21 to protect the system from overloads, then plugged into a standard wall outlet. A 24-hour clock 10 is one readily available having a daytime and nighttime area and can be set to energize in preselected intervals. Thus it may be set to be actuated twice a day for feeding a pet with that frequency and with the ten insulated containers provided will feed a pet for five consecutive days. The insulation keeps the food from spoilage and will keep food hot or cold for reasonable periods of time, especially when the use of the dispenser is only for a one or two-day period such as over a weekend.

As described earlier, insulated food containers can be readily removed for cleaning and/or refilling through the top access opening. When the clock 10 reaches its predetermined setting it actuates a switch which in turn actuates solenoid 9 whose plunger moves to actuate the ratchet pawl arm which in turn picks up a ratchet tooth of ratchet 13 and moves it against the resistance of the braking mechanism one-tenth of the peripheral distance of the dispensing wheel so that the next insulated food container 1 is lined up over the food pan 4. The solenoid 9 has its actuation dampened by means of a dashpot 7 so that it will not jar the pawl and ratchet mechanism unnecessarily. As the ratchet pawl arm reaches its fully extended position which at the same time causes the insulated food container to be indexed to its proper position it has an extended trip member 12A that actuates through a switch actuator 8A a microswitch 8. This microswitch 8 is connected in a low voltage circuit to low voltage solenoid 5 which as described earlier trips trip lever 2 of the dispensing container now aligned with the food pan so that the container lid 35 can fall open and the contents of the container fall into the food pan. The low voltage solenoid 5 receives its low voltage through transformer 6 which is connected through the clock 10 into the house current.

Obviously variations in the circuit can be made as long as the functional sequence of events properly occurs. For example, the solenoid 9 may likewise be in a low voltage circuit or both solenoids could be in a higher voltage circuit. Likewise other operating mechanism could be selected. When the clock 10 has passed its point of sending an actuated signal it cuts the power to the circuit, thus deactuating solenoid 9 which returns under its own spring power internally to retractive position and likewise deactuates solenoid 5 which is biased to return to a retracted position. Ratchet pawl arm 12 is returned to its retracted position by pawl return spring 15 so that the next time it is actuated it picks up the next ratchet tooth associated with the next insulated food container to in turn rotate it into an indexed position over the food pan 4. During these deactuations the microswitch 8 also has a spring bias to the deactuated position, as it is a normally opened switch. The next time the time clock 10 indicates food is to be dispensed the entire operation is repeated and such sequence is continually repeated at predetermined intervals until the homeowner returns or until all ten insulated food containers are emptied.

While the invention has been specifically described, it will be appreciated that it may be embodied in numerous other forms without departing from the spirit or central characteristics of the invention herein. Therefore, the present embodiment of the invention is to be considered in all respects as illustrative and not restrictive, the scope of the invention being indicated by the appended claims rather than by the foregoing description and all changes which come within the meaning and range of the equivalency of the claims are therefore intended to be embraced therein.

What is claimed is:

1. A timed pet food dispenser comprising:
   a dispenser stand,
   a dispensing wheel rotatably mounted for rotation in a vertical plane about a horizontal shaft mounted on said stand,
   a dispenser cover enclosing said dispensing wheel having a food drop opening at the bottom portion thereof and a top access opening therein for removing, cleaning, filling and replacing said food containers,
   a plurality of insulated food containers rigidly mounted on said dispensing wheel in the vicinity of the periphery thereof and adapted to be removed therefrom by a twisting motion,
   an indexing means for indexing said dispensing wheel to a plurality of positions corresponding to the location of said food containers mounted thereon and to advance said food containers to a dispensing position,
   a container cover hingedly attached to each of said food containers,
   a trip lever for holding each of said container covers in a closed position and adapted, when tripped in said dispensing position, to permit said associated container covers to open and permit the contents of said associated food container to fall by gravity into a pet eating area,
   a 24-hour time clock settable to a predetermined time for feeding,
   an actuating means for tripping the trip lever of said food container located in said dispensing position whereby the container cover of said food container is permitted to open and any food contained therein permitted to be dispensed therefrom by gravity, and solenoid means associated with said indexing means and adapted to be actuated by said time clock to advance sequentially said food containers one at a time to said dispensing position, said solenoid's movement being delayed until after said actuating means trips said trip lever dispensing the contents of the food container before being permitted to index said dispensing wheel to the next position where it is maintained until the next feeding time.

2. The timed pet food dispenser of claim 1 wherein said dispensing wheel is rotated by said solenoid in one direction but is free to rotate in the opposite direction for cleaning or removal of said food containers.

* * * * *